(12) United States Patent
Aberg

(10) Patent No.: US 6,993,362 B1
(45) Date of Patent: Jan. 31, 2006

(54) PORTABLE COMMUNICATION APPARATUS HAVING A HIERARCHICAL MENU SYSTEM AND A DYNAMIC MENU

(75) Inventor: Kristoffer Aberg, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/523,984

(22) Filed: Mar. 13, 2000

(30) Foreign Application Priority Data

Mar. 16, 1999 (SE) .................................. 9900946

(51) Int. Cl.
*H04M 1/00* (2006.01)
(52) U.S. Cl. ................ 455/566; 455/550.1; 455/575.1; 455/90.1; 715/825; 345/169; 345/684; 345/685; 345/689
(58) Field of Classification Search ................ 455/550, 455/566, 575, 90; 345/169, 684, 685, 688; 715/825
See application file for complete search history.

(56) References Cited

U.S. PATENT DOCUMENTS

| 5,761,610 A | | 6/1998 | Sorensen et al. | |
|---|---|---|---|---|
| 6,061,576 A | * | 5/2000 | Terrasson | .................. 455/566 |
| 6,314,285 B1 | * | 11/2001 | Isberg et al. | |
| 6,359,572 B1 | * | 3/2002 | Vale | |
| 6,381,474 B1 | * | 4/2002 | Kraft | |
| 6,400,958 B1 | * | 6/2002 | Isomursu et al. | ........... 455/466 |

FOREIGN PATENT DOCUMENTS

| CA | 2169177 | 9/1996 |
|---|---|---|
| EP | 0 891 066 | 1/1999 |

OTHER PUBLICATIONS

PCT IPER for PCT/SE00/00474/II making reference to Microsoft Outlook 98.

* cited by examiner

*Primary Examiner*—Joseph Feild
*Assistant Examiner*—Huy D. Nguyen
(74) *Attorney, Agent, or Firm*—Nixon & Vanderhye P.C.

(57) ABSTRACT

A portable communication apparatus, such as a mobile telephone, has a display, a user-controlled input device, a memory, a controller, and a hierarchical menu system stored in the memory. The menu system has a plurality of menus, including top-level menus, sub-level menus, and a plurality of menu items under respective menus. The controller is arranged to present individual menus/menu items on the display, receive selection commands from a user through the user-controlled input device and in response perform functions related to the presented menus/menu items. The memory of the apparatus has a dynamic menu, the contents of which may be modified by the user. The dynamic menu is either a top-level menu or a sub-level menu in the hierarchical menu system.

13 Claims, 2 Drawing Sheets

PORTABLE COMMUNICATION APPARATUS HAVING A HIERARCHICAL MENU SYSTEM AND A DYNAMIC MENU

TECHNICAL FIELD

The present invention relates to a portable communication apparatus, such as a mobile telephone, having a display, a user-controlled input device, such as a keypad, a memory, a controller and a hierarchical menu system stored in the memory. The menu system has a plurality of menus, including top-level menus and sub-level menus, and a plurality of menu items under respective menus. The controller is arranged to present individual menus or menu items on the display, is arranged to receive selection commands from a user through the user-controlled input device and is arranged to perform functions related to selected menus or menu items. The memory of the apparatus further comprises a dynamic menu, the contents of which may be modified by the user.

BACKGROUND ART

Mobile or cellular radio telephones are a well-known example of a portable communication apparatus according to the above. Other common examples are for instance personal communicators, personal digital assistants, paging devices, etc. Throughout this document, the present invention is illustrated in terms of a mobile telephone, in an exemplifying and non-limiting sense.

As mobile telephones have become more advanced and miniaturized, it has become increasingly important to provide an intuitive and yet precise interface to the user. The available man-machine interface in a mobile telephone is normally restricted to a display (such as an LCD display) and a keypad. Therefore, and it is an all but simple task to provide an adequate level of user-friendliness, particularly when bearing in mind that while modern mobile telephones are provided with more and more functions and features, the displays thereof have not been increased accordingly (mainly due to market demands for a limited overall apparatus size).

One well-known way of providing a user-friendly interface is to use a menu system as set out above. The various functions or features of the telephone are represented by different menus, sub-menus and menu items. The user navigates in the menu system by using certain control keys on the keypad for sequentially scrolling through the various menus. The user selects a certain menu or menu item by pressing a certain key or combination of keys on the keypad.

Although such menu systems are easy for users to utilize, they still have some disadvantages. For instance, if a large number of features are available, the user may have to scroll through several menus and menu items until arriving at the particular feature, that the user is looking for. Furthermore, not all users have identical needs and preferences; one user may prefer a certain menu structure, which may be less useful to another user. Therefore, it is difficult for the telephone manufacturer to design a menu structure, which fits all users.

The above drawback may be reduced by providing a short menu system and an extended menu system, where the contents of the short menu system is a subset of the extended menu system. Such a menu structure is disclosed in GB-A-2 293 951 (Motorola Inc.), where the user may choose, while scrolling through the extended menu system, to move individual menu items from the extended menu system to the short menu system, and where the user may delete individual menu items from the short menu, while scrolling through it. Hence, the short menu system is dynamic in the sense, that the user may customize the short menu system to include only such menu items, which are desired by the user.

The user enters the extended menu system by pressing a specific menu key on the keypad for a time greater than a predetermined time period. If, on the other hand, the menu key is pressed for a time shorter than the predetermined time period, the short menu system is entered. Both the extended menu system and the short menu system comprise various top-level menus (called "branches"), which in turn may comprise various sub-level menus and/or menu items for performing different functions in the mobile telephone.

While the approach shown in GB-A-2 293 951 has a distinct advantage in that it allows the user to customize the short menu system, some disadvantages still remain. For instance, the use of two different menu systems (extended and short, respectively) requires that the user have to learn the respective menu structure of both menus. Accordingly, the user will have to remember in which menu system a particular menu item is located, before entering the extended or short menu system. In reality, the user will probably use the short menu system in most cases, since the short menu system will enable the user to arrive at a desired menu item more quickly, as described above. However, the user will most likely not be able to remember exactly which menu items, that are currently included in the short menu system. Therefore, every once in a while, the user may find himself in a position, where he has entered the short menu system but looks for a menu item, which is only included in the extended menu system. In such a case, the user will have to exit the short menu system and then enter the extended menu system, as described above, and traverse the hierarchy of the extended menu system, until arriving at the desired menu item. Being left with a small keypad as the only available user input device, such a procedure may involve several or even numerous key pressings, until the desired menu item is eventually found.

A similar concept of customizing a short menu system has been used in recent mobile telephone models manufactured by the present applicant. Here, the extended menu system has a separate customization menu, one menu item of which is for entering a mode for customizing the short menu system, i.e. by adding/removing individual menu items of the extended menu system to/from the short menu system. A drawback of this approach is that, in order to customize the short menu system, the user has to enter the customization mode through aforesaid separate menu. Furthermore, the user still has to learn two separate menu structures.

SUMMARY OF THE INVENTION

It is an object of the present invention to provide an improved menu system for a portable communication apparatus, such as a mobile telephone. More particularly, the present invention aims at providing a dynamic menu, which may be customized by the user, which is easily accessible from the normal menu system ("extended menu system") and which also allows the user to add and delete menu items in an easy way.

The objects of the present invention have been obtained by providing the dynamic menu as either a toplevel menu or a sub-level menu within the normal menu system, meaning that the user will not have to learn the structure of two different menu systems (a short and an extended menu system) and that all previously added menu items are always accessible through the dynamic menu within the normal menu system.

According to a preferred embodiment of the present invention, the dynamic menu comprises a specific menu item, which provides a function for modifying the contents of the dynamic menu, e.g. by presenting a list of available menu items, from which the user may select certain items to be added to the dynamic menu. Also, the preferred embodiment comprises a similar function for removing menu items from the dynamic menu.

BRIEF DESCRIPTION OF THE DRAWINGS

The present invention will now be described in more detail, reference being made to the accompanying drawings, in which.

Other objects, advantages and features of the present invention will appear from the following detailed disclosure, from the claims and from the drawings.

DETAILED DISCLOSURE OF THE INVENTION

Figure 1:
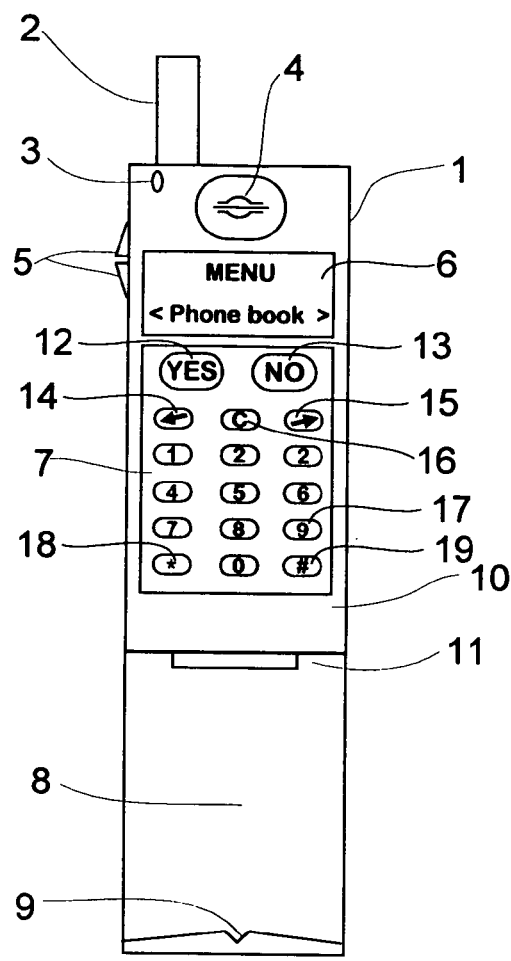
FIG. 1 is a schematic front view of a portable communication apparatus, in the form of a mobile telephone, having a menu system according to the present invention.

FIG. 1 illustrates a mobile telephone 1 as one example of a portable communication apparatus according to the invention. The mobile telephone comprises an apparatus housing 10, to which a swingable flip 8 is pivotally mounted by means of a hinge mechanism 11. A sound opening 9 is provided at one end of the flip 8 for receiving vocal sound from a user of the telephone. A microphone (not shown in FIG. 1) is located inside the apparatus housing 10 adjacently to the hinge mechanism 11. An internal sound guiding channel is provided inside the flip 8 for guiding sound received through the opening 9 to the microphone.

The mobile telephone 1 further comprises an external antenna 2 mounted on the top of the apparatus housing 10, a visual status indicator 3 (such as an LED), and a speaker 4. Volume control buttons 5 are provided at one side of the housing 10. The mobile telephone further comprises a graphical display 6, such as an LCD display. As shown in FIG. 1, the user of the telephone may utilize a menu system presented on the display 6 for controlling and operating the mobile telephone.

The mobile telephone further has a keypad 7, comprising various keys such as a "YES" (OK) key 12 and a "NO" (cancel) key 13, menu scroll keys 14 and 15, a clear key 16, a total of ten (0 through 9) numeric keys 17, an asterisk key 18 and a square key 19.

Apart from the menu system, which will be described in more detail below, the above components of the mobile telephone are generally known per se and do not require any further explanation herein.

Figure 2:
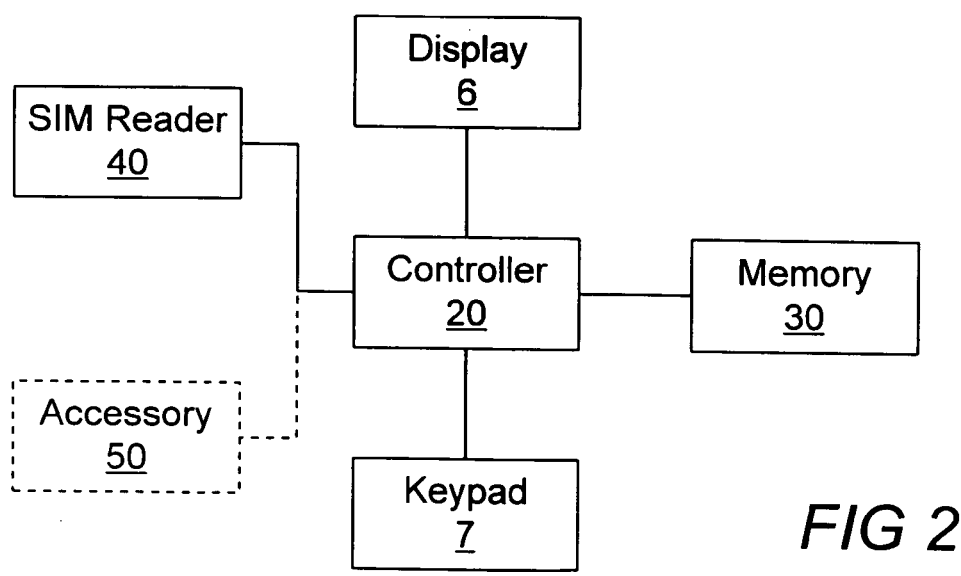
FIG. 2 is a schematic block diagram of the communication apparatus in FIG. 1.

As shown in FIG. 2, the mobile telephone 1 comprises a controller 20, preferably a microprocessor (CPU), which is operatively connected to the display 6 and the keypad 7. The controller 20 is also connected to a memory 30, such as an EEPROM memory. In the context of the present invention, the memory 30 is arranged for storing the inventive menu system. However, the memory 30 may also store other digital data of the mobile telephone 1, such as an operating system (OS), user settings parameters, utility programs (such as a calculator or various computer-type games), as is all readily understood by a man skilled in the art.

Furthermore, the controller 20 is operatively connected to a card reader 40 for accessing a SIM ("Subscriber Identity Module") card inserted in the mobile telephone. In some applications, the mobile telephone 1 may be connected to one or more than one accessory 50; in such a case, the controller 20 is also operatively connected to such an accessory, as indicated by a dashed line in FIG. 2.

In common with various known mobile telephones, for instance the one disclosed in GB-A-2 293 951, the mobile telephone 1 provides a user interface in the form of a menu system presented on the display 6. The menu system is stored in memory 30 and is executed by the controller 20, preferably by a dedicated menu program process run by the controller 20. Alternatively, the menu system may be built into the operating system of the mobile telephone 1. The user enters and uses the menu system by submitting commands from the keypad 7, as will be described in more detail below.

Figure 3:
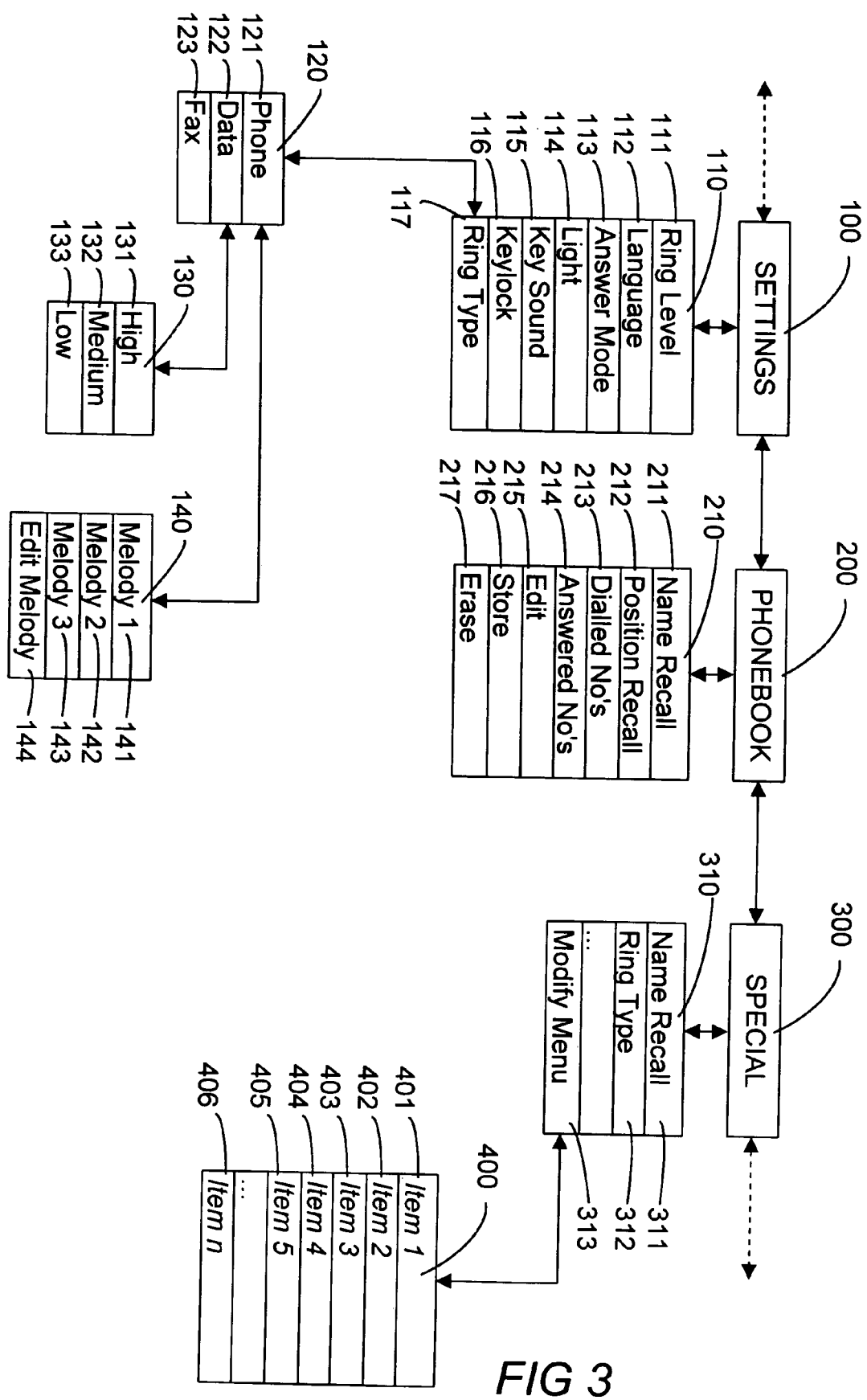
FIG. 3 is a schematic diagram of a menu system according to the present invention, including a dynamic menu, which may be modified by a user of the communication apparatus.

Parts of the menu system are shown in FIG. 3. The menu system comprises a plurality of top-level menus 100, 200, 300, a plurality of sub-level menus 110, 120, 130, 140, 210, 310, 400, and a plurality of menu items 111–116, 121–123, 131–133, 141–144, 211–217, 311–313 and 401–406. Some of the menu items are in fact subordinate sub-menus, which in turn may comprise further sub-menus and/or menu items. Thus, a hierarchical menu system is formed, which may be traversed by the user for controlling the functionality and features of the mobile telephone.

Three top-level menus are shown in FIG. 3: a SETTINGS menu 100, a PHONEBOOK menu 200 and a SPECIAL menu 300. The SPECIAL menu 300 is a dynamic menu, the contents of which may be modified by the user, as will be described below. Furthermore, the menu system comprises other top-level menus not shown in FIG. 3, such as a MAIL menu (e.g. for reading and sending short messages), a CLOCK menu (for setting date and time, setting an alarm, etc.), a CALCULATOR menu (for entering a special calculator mode, where the user may use the keys on the keypad 7 for performing numeric calculations), an ACCESS menu (for barring certain call types, locking the telephone or the SIM card, etc.), a NETWORKS menu (for selecting the mobile telecommunications network to be used by the telephone), etc. Other top-level menus may also be provided, which are generally well-known per se in the field of mobile telephones.

The user enters the menu system by pressing a particular key on the keypad 7. For instance, the menu system may be entered by pressing one of the scroll keys, 14, 15. Once the menu system has been entered, one of the top-level menus is presented on the display 6. In FIG. 1, the user is assumed to have pressed the left scroll key 14, wherein the PHONEBOOK menu 200 is shown on the display 6. If the user is looking for another top-level menu, he may continue to scroll through the menu system by means of the left scroll key 14 or the right scroll key 15, as indicated by bidirectional horizontal arrows in FIG. 3. Preferably, the chain of top-level menus is endless, so that pressing the right scroll key 15 after the last (rightmost) top-level menu will bring the user back to the first (leftmost) top-level menu. Conversely, pressing the left scroll key 14 at the first top-level menu will bring the user to the last (rightmost) top-level menu.

Once the user has located the "correct" top-level menu, for instance the PHONEBOOK menu 200, he may enter a sub-level menu 210 by pressing a particular key on the keypad 7, such as the YES key 12. By doing so, the sublevel menu 210 will be presented on the display 6, either one menu item 211–217 at a time or (provided that the display 6 is large enough) all items simultaneously. As shown in FIG. 3, the sub-level menu 210 under top-level menu 200 comprises the following menu items: a Name Recall menu item 211, a Position Recall menu item 212, a Dialled Numbers menu item 213, an Answered Numbers menu item 214, an Edit menu item 215, a Store menu item 216 and an Erase menu item 217.

Menu items 211 and 212 allow the user to search through the various entries in the phonebook of the mobile telephone 1, said phonebook being stored in the memory 30, as is generally known in the field of mobile telephones. Menu items 213 and 214 allow the user to select a recently used telephone number in order to make an additional call to that number. Menu item 215 allows the user to edit the entries in the phonebook, while menu item 216 allows the user to store a new entry in the phonebook. Finally, menu item 217 allows the user to erase or delete a particular entry in the phonebook.

The SETTINGS top-level menu 100 comprises a sub-level menu 110 having a Ring Level menu item 111, a Language menu item 112, an Answer Mode menu item 113, a Light menu item 114, a Key Sound menu item 115, a Keylock menu item 116 and a Ring Type menu item 117. Similar to the PHONEBOOK menu described above, the menu items of the SETTINGS menu are generally known and do not require any further explanation herein. For exemplifying reasons, the Ring Type menu item 117 is illustrated in more detail in FIG. 3. The Ring Type menu item 117 has a subordinate submenu 120, comprising a Phone menu item 121, a Data menu item 122 and a Fax menu item 123. The Phone menu item 121 in turn has a subordinate submenu 140, comprising various menu items 141–143 for selecting a particular melody or Ringtone pattern to be used by the telephone when announcing an incoming telephone call. The menu 140 also has an Edit Melody menu item 144, which allows the user to compose a customized ringtone pattern. The submenu 130 of the Data menu item 122 has three menu items 131–133 for setting the volume of the ringtone pattern used for announcing an incoming data call.

The user may select a particular menu item by pressing a specific key on the keypad 7, such as the YES key 12. The user may exit from any of the top-level or sublevel menus by pressing a particular key, such as the NO key 13. Furthermore, the user may exit the entire menu system by pressing another key, such as the clear key 16.

Some portions of the menu system may depend of whether an accessory 50 is connected to the mobile telephone 1. Furthermore, portions of the menu system may be dependent of the identity of the SIM card inserted in the mobile telephone 1. For instance, the SIM card may contain information that restricts the user from using certain functions of the telephone or performing certain expensive telephone calls. Conversely, when an accessory 50 is attached to the telephone, one or several new top-level menus may be provided for controlling and using that piece of accessory.

The essence of the present invention lies in the provision of the SPECIAL top-level menu 300, which is dynamic (the contents may be modified by the user) and is accessible through the normal menu system of the mobile telephone 1. Contrary to the prior art approaches described in previous sections, the provision of the dynamic SPECIAL menu 300 as a top-level menu within the normal menu system will make the mobile telephone easier to use than the prior art telephones. For instance, there is no need for the user to learn the structures of two separate menus, i.e. a short menu and an extended menu, as in aforesaid GB-A-2 293 951.

Referring to FIG. 3, a preferred embodiment of the dynamic SPECIAL menu 300 will now be described. As previously mentioned, the dynamic menu 300 is included as a part of the overall menu structure (top-level menus 100, 200, 300, sub-level menus 110, 120, 130 . . . , etc). The dynamic menu 300 comprises a sub-menu 310 with a plurality of menu items 311, 312, at least some of which may be prestored in the memory 30 by the manufacturer, so that on first use, the dynamic menu 300 will contain e.g. a Name Recall menu item 311 and a Ring Type menu item 312. These menu items are identical to the menu item 211 found under the top-level PHONEBOOK menu 200 and the menu item 117 found under the top-level SETTINGS menu 100, respectively. When any of the menu items 311–312 is selected in the dynamic sub-menu 310, the normal corresponding function will be invoked, in precisely the same manner as if the particular menu item were selected via any of the regular menus 100, 200, etc., elsewhere in the menu system. The last item in the dynamic sub-menu 310 is a Modify Menu menu item 313. Upon selection of this menu item, a sub-menu 400 is presented. Sub-menu 400 comprises various menu items 401–406 from other top-level menus, such as the SETTINGS menu 100 and the PHONEBOOK menu 200. The menu items 401–406 of the sub-menu 400 are given generic names ("Item 1, Item 2 . . . ") in FIG. 3. In reality, the sub-menu 400 comprises a long list of available menu items, such as Ring Level (cf. menu item 111 of SETTINGS sub-menu 110), Language (112), Answer Mode (113), Light (114), Key Sound (115), Keylock (116), Ring Type (117), Name Recall (211), Position Recall (212), etc. The menu items may be presented sequentially (one by one) on the display 6, or alternatively several menu items 401–406 may be presented simultaneously. By using certain keys (such as the scroll keys 14, 15 and the YES key 12), the user may add any of the menu items 401–406 to the dynamic sub-menu 310 of the top-level SPECIAL menu 300.

As shown above, the sub-menu 400 may also contain menu items, which are already contained in the dynamic menu 310 (i.e., Name Recall 311 and Ring Type 312). If either of these menu items are selected in the sub-menu 400, the corresponding menu item 311 or 312 will be removed from the dynamic menu 310. Hence, the user is given an opportunity not only to add new menu items to the dynamic menu 310 but also to remove menu items therefrom.

Alternatively, the dynamic menu 300, together with its sub-menus 310, 400, may be implemented, so that sub-menu 400 only contains available menu items, which are not already present in sub-menu 310. In such a case, the user may be provided with an option to delete a specific menu item 311, 312 from the dynamic sub-menu 310 by pressing a predetermined key or combination of keys, such as the clear key 16.

According to yet another alternative, selecting a menu item 401–406 in the sub-menu 400 may display a set of options applicable to the selected item, e.g. options for adding or removing the menu item from the dynamic menu 310. For instance, when a particular menu item 401–406 has been selected in the sub-menu 400 (by pressing the YES key 12), pressing the YES key 12 once more may cause the selected menu item to be inserted into the dynamic menu 310, while pressing the NO key 13 may cause removal of the selected menu item from the dynamic menu 310.

Normally, when a new menu item, once selected in the sub-menu 400, is to be added to the dynamic menu 310, the first empty position in menu 310 will be assigned to the selected menu item. Preferably, an option is provided, when adding a menu item to the dynamic menu 310, for deciding the position of the new menu item in the dynamic menu 310. The position may be entered by the user by selecting appropriate numeric keys 17 on the keypad 7. Selection of an already existing position will result in shifting all menu items located below the selected position down one position in the dynamic menu 310, followed by insertion of the new menu item at the selected position.

Upon removal of a menu item 311–312, any menu items below the removed one will be shifted up one position in the dynamic menu 310.

It may be preferable to put some restrictions as to which menu items will be available for selection in the sub-menu 400. For instance, menu items related to an accessory 50 or SIM card-specific menu items may be omitted from the list of the available items 401–406 in the sub-menu 400.

The present invention has been described above with reference to an exemplifying embodiment. However, the invention may be exercised in other ways than the one described above within the scope of the invention, as defined by the appended independent patent claim. For instance, the dynamic SPECIAL menu 300 does not have to be a top-level menu; the dynamic menu may be located anywhere further down the menu hierarchy, i.e. as a sub-menu of any top-level or sub-level menu in the menu system.

What is claimed is:

1. A portable communication apparatus having a display, a user-controlled input device, a memory, a controller and a hierarchical menu system stored in the memory, the menu system comprising a plurality of menus, including top-level menus, and a plurality of menu items under respective menus, the controller being arranged to present individual menus/menu items on the display, receive selection commands from a user through the user-controlled input device and in response perform functions related to the presented menus/menu items, the memory of the apparatus further comprising a dynamic menu, wherein the controller is further arranged to modify the dynamic menu in immediate response to direct user inputs through the user-controlled input device, and wherein the dynamic menu is either a top-level menu or a sub-level menu in the hierarchical menu system.

2. A portable communication apparatus as in claim 1, wherein the dynamic menu comprises a menu item for providing a function for modifying the dynamic menu.

3. A portable communication apparatus as in claim 2, wherein the controller is arranged, when providing said function for modifying the dynamic menu, to present a list of available menu items on the display, the list comprising menu items from other menus than the dynamic menu, to accept a selection command through the user-controlled input device and in response add a selected menu item to the dynamic menu.

4. A portable communication apparatus as in claim 2, wherein the controller is arranged, when providing said function for modifying the dynamic menu, to present a list of menu items on the display, the list comprising menu items already located in the dynamic menu, to accept a selection command through the user-controlled input device and in response delete a selected menu item from the dynamic menu.

5. A portable communication apparatus as in claim 2, wherein the controller is arranged, when providing said function for modifying the dynamic menu, to provide a function for allowing a user to decide a sequential position of any menu item of the dynamic menu.

6. A portable communication apparatus according to claim 1, wherein the dynamic menu comprises at least one prestored menu item provided by a manufacturer before first use of the portable communication apparatus.

7. A portable communication apparatus according to claim 1, wherein the apparatus is a mobile telephone.

8. The apparatus of claim 1, wherein the contents of the dynamic menu stored in the memory may be modified by the user through the user-controlled input device according to preferences of the user.

9. A method for use with a portable communication apparatus having a display, a user-controlled input device, a memory, a controller, and a hierarchical menu system stored in the memory, the menu system including a plurality of menus, including top-level menus and sub-level menus, each having a plurality of menu items under respective menus, and a dynamic menu, where the dynamic menu is either a top-level menu or a sub-level menu in the hierarchical menu system, wherein the dynamic menu includes a menu item associated with a function for modifying a number of available dynamic menu items for controlling the functionality of the apparatus, comprising:

the controller presenting individual menus with menu items on the display;

the controller receiving selection commands from a user through the user-controlled input device, and in response, performing functions related to the presented menus and menu items; and the controller receiving menu modification commands in response to direct user input by the user-controlled input device, and in immediate response, modifying the dynamic menu.

10. The method in claim 9, wherein the controller, when providing said function for modifying the dynamic menu, presents a list of available menu items on the display, the list comprising menu items from other menus than the dynamic menu, accepts a selection command through the user-controlled input device, and in response, adds a selected menu item to the dynamic menu.

11. The method in claim 9, wherein the controller, when providing said function for modifying the dynamic menu, presents a list of menu items on the display, the list comprising menu items already located in the dynamic menu, accepts a selection command through the user-controlled input device, and in response, deletes a selected menu item from the dynamic menu.

12. The method in claim 9, wherein the controller, when providing said function for modifying the dynamic menu, provides a function for allowing a user to decide a sequential position of any menu item of the dynamic menu.

13. The method in claim 9, wherein the contents of the dynamic menu stored in the memory may be modified by the user through the user-controlled input device according to preferences of the user.

* * * * *